United States Patent Office

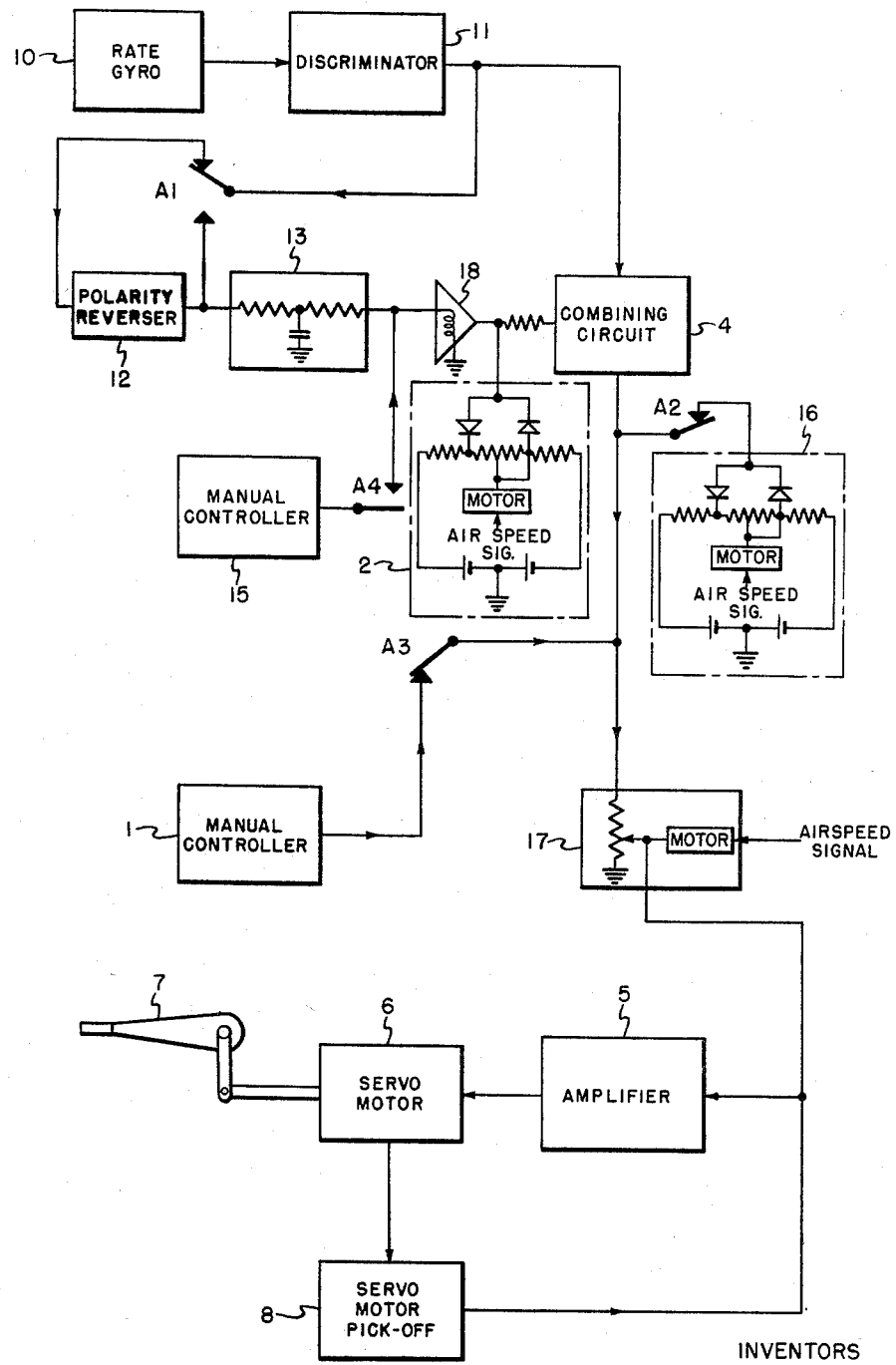

2,936,136
Patented May 10, 1960

2,936,136

CONTROL SYSTEMS FOR AIRCRAFT

Marcus Lionel Jofeh, Stoke Poges, and Frederick Arthur Summerlin, Isleworth, England, and Douglas George Downes, Pointe Claire, Quebec, Canada, assignors to The Sperry Gyroscope Company Limited, Brentford, England, a company of Great Britain Application February 19, 1957, Serial No. 641,226

Claims priority, application Great Britain February 24, 1956

13 Claims. (Cl. 244—77)

This invention relates to control systems for aircraft and in particular to manual control systems suitable for fast manoeuvring during, for example, combat.

In manual control systems generally, it is known to have a manual controller operable by the pilot, which controller provides demand signals, either electric or hydraulic, for controlling the control surface of an aircraft.

To assist in fast manoeuvring, it is also known to provide an auxiliary controller which is a smaller version of the normal manual controller and is arranged for operation by one hand only. For fast manoeuvring the auxiliary manual controller is switched in and the normal manual controller is switched out so that the former provides the demand signals.

According to the invention there is provided an aircraft control system having provision for producing turning movement of the aircraft about an axis by actuation of a control surface in dependence upon the displacement of a manual controller, wherein the system functions in response to a given displacement of the manual controller to produce a rate of turn of the aircraft about the axis which is initially high, and subsequently falls with time to a lower value substantially proportional to the displacement of the manual controller.

Preferably this result is achieved by energising a servo-motor connected, or adapted to be connected, to actuate the control surface by a resultant signal which is the difference between a signal that is a measure of the displacement of the manual controller and a feed-back signal which is initially of one value and increases with time to a higher value.

According to another aspect of the invention there is provided an aircraft control system comprising a servo-motor connected, or adapted to be connected, to actuate a control surface, a manual controller adapted to provide a control signal dependent on its displacement from a zero position, a device responsive to turning movements of the aircraft about the axis about which the control surface is effective to exercise control and to provide a rate-of-turn signal in response to such turning movements, means for providing a signal that is a delayed version of the rate-of-turn signal, means for adding the rate-of-turn signal and the delayed version of the rate-of-turn signal, means for obtaining the difference between the signal that is a measure of the displacement of the manual controller and the signal from said adding means and for supplying said difference signal to energise the servo-motor.

The manual controller may be the normal manual controller or the auxiliary manual controller in the aircraft and the demand signal may, for example, be electric or hydraulic. As a further alternative the manual controller may be stationed on the ground and linked, for example, with a pilotless craft or missile by radio or the like.

When a sudden change in the demand signal occurs the sum signal assumes a high value which decreases to a smaller value substantially equal to the demand signal if the demand signal is not continually changing. Thus if an aircraft is being steered in a curved path to follow a moving target and the rate of turn of the aircraft has been too slow during a short period, then an increase in the displacement of the manual controller to increase the rate of turn has the effect not only of increasing the steady rate of turn of the aircraft but of superimposing an additional transient rate of turn. Such a short term additional rate of turn will help to reduce the lag of the rate of turn of the aircraft behind the target rate of turn.

In order that the invention may readily be carried into effect, an embodiment will now be described with reference to the accompanying drawing in which is shown schematically an aircraft control system for controlling the aircraft about one of its axes in two alternative modes of operation, the manoeuvre mode and the normal manual mode with automatic stabilization.

In the manoeuvre mode which enables fast manoeuvring for combat purposes, the relay contacts A1, A2, A3 and A4 are in the relay energised positions as opposed to the unenergised positions shown in the drawing.

On movement of the auxiliary manual controller 15 an electrical demand signal of magnitude and polarity dependent upon its displacement is developed and passed through relay contacts A4 to be added algebraically to a signal from delay network 13. The maximum magnitude of this sum signal is limited as a function of airspeed by biassed rectifier limit device 2. The sum signal is amplified in amplifier 18 which has an amplifying factor of about five and is algebraically added with a signal from rate gyro 10 in a combining circuit 4. The production of the signals in network 13 and the combining circuit 4 will be discussed hereinafter but the polarities of the signals will be such that the demand signal from the manual controller 15 will be opposed by the sum of the signals from the rate gyro and the delay network 13.

The combined signal from combining circuit 4 is supplied to an amplifier 5 via a variable control device 17 which is controlled in accordance with airspeed and/or Mach number for a purpose to be discussed hereinafter. The output of amplifier 5 controls a servo motor 6 connected to a control surface 7. A servo-motor pick-off 8, associated with the output member of servo-motor 6, provides a displacement feedback signal to the input of amplifier 5.

Displacement of control surface 7 causes the aircraft to turn about the axis of control so that rate gyro 10 provides an A.C. output, the magnitude and phase of which is dependent upon the rate and sense of the turn. This A.C. signal passes to a discriminator 11 which converts the A.C. signal into a D.C. signal having a magnitude and polarity corresponding to the A.C. signal magnitude and phase.

This D.C. signal is supplied, on the one hand, direct to combining circuit 4 and, on the other hand, through contact A1 and a network or delay circuit 13 to combining circuit 4. The circuit 13 may conveniently be a simple R-C integrating circuit, the output being of such polarity as to add to the direct rate of turn signal. Thus when the signal from rate gyro 10 changes, the output from combining circuit 4 is a signal which increases from one value to another value during a time interval corresponding to the time constant of the integrator, which time constant may conveniently be one second. Thus when the controller 15 is moved the net input signal to amplifier 5 is initially high and decreases as the feedback signal increases. In consequence the control surface 7 is displaced in such a manner that, for a given displacement of manual controller 15, a rate of turn of the aircraft is produced which is initially high and subsequently falls with time to a lower value substantially proportional to the displacement of the manual controller.

It will be appreciated that the output from the combining circuit 4 may be regarded as the algebraic sum of a rate-of-turn demand signal from the manual controller 15 and a rate-of-turn feed-back signal opposing said demand signal and constituted by the sum of the rate gyro signal plus a delayed version of the rate gyro signal, both the latter signals being of opposite polarity to the demand signal.

At high rates of turn the control is dominated by the feed-back loop via the rate gyro 10 rather than the feedback loop via pick-off 8 so that the setting of the controller 1 tends to demand a rate of turn of the aircraft rather than a displacement of control surface.

In the normal manual control mode with automatic stabilization the relay contacts A1, A2, A3 and A4 are as shown in the drawing so that the normal manual controller 1 provides the demand signal. A signal from discriminator 11 passes through contacts A1 to a polarity reverser 12 before passing through network 13 to a combining circuit 4 with the result that the signal from the network 13 now tends to decrease the output of discriminator 11 in the combining circuit 4. The polarity reverser also includes an attenuating circuit which is effective to decrease its input with an attenuating factor about equal to the amplification factor of amplifier 18. Thus when the rate-of-turn signal from rate gyro 10 increases, the total feedback signal from combining circuit 4 assumes a value corresponding to the change and decreases with time to a value approaching zero. As a result, sudden changes in a rate of turn produced by displacement of the manual controller will be automatically damped by the output signal from the combining circuit 4. Thus autostabilization of the aircraft is provided in the normal manual control mode during straight flight and during command turns. The maximum signal from combining circuit 4 is limited as a function of airspeed by biassed rectifiers 16. The resultant effect is that, in the normal manual mode of control, since the feedback signal never exceeds the limiting value, setting of the manual controller 15 demands a displacement of the control surface 7 rather than a rate of turn of the aircraft, i.e. the feedback loop via pick-off 8 rather than the rate-of-turn feedback loop tends to dominate the control system especially at low rate of turn, whilst sudden changes in a rate of turn produced as a result of a setting of the manual controller are automatically damped because such changes due, for example, to wind gust and the like, which may give rise to high rates of turn of short duration, will produce a signal from the rate gyro 10 which exceeds the signal from the delay network 13 and is in advance of it.

In the norman manual mode of operation the limiter 2 may be rendered ineffective if desired.

In the manoeuvre mode of control the feedback signal from combining circuit 4 not only acts as the dominant feedback signal during high rates of turn but also provides improved stabilization against external disturbances. This is because the rate-gyro signal is supplemented by a signal analogous, for short term periods, to an integral of itself so that the behaviour of the aircraft reacting against short term disturbances is analogous to that of an aircraft controlled by stabilizing signals provided by both a rate gyro and an angular position gyro. The long term behaviour however is not analogous to one in which an angular-position control term is used since there is no long-term angular-position reference.

Since the rate-of-turn feedback loop includes the aircraft and also since the response of the aircraft to displacement of control surface 7 varies as a function of airspeed of the aircraft, it will be observed that in the absence of variable control device 17 the gain in the loop will increase with increase of airspeed. To avoid instability in the system arising from such increases in gain, variable control device 17 is provided between combining circuit 4 and amplifier 5. Variable control device 17 is controlled as a function of airspeed in such manner as to counteract to a substantial extent the increase in loop gain resulting from increased response of the aircraft at increased airspeeds.

It is not necessary that two different manual controllers should be used for the two modes of control since the control system would work satisfactorily using a single controller, namely the normal control column, with a suitable device for opening the switch A3 and connecting the output of the controller 1 to the amplifier 18, but in certain arrangements there is some advantage in using an auxiliary manual controller which preferably is provided with low centralising forces, dynamic balancing and viscous damping.

The rate of turn signal may be provided by any device responsive to rate of turn, e.g. a rate-gyro, an angular accelerometer with integration or a lateral accelerometer.

We claim:

1. An aircraft control system having provision for producing turning movement of the aircraft about an aircraft axis of motion by actuation of a control surface in dependence upon the displacement of a manual controller comprising means for providing a signal dependent upon the displacement of the manual controller, means for providing a feedback signal having two components which for a given rate of turn are, respectively, a measure of the rate of turn and a delayed version of the measure of the rate of turn, means responsive to said signals for providing a signal which is the difference between the signal from the manual controller and the feedback signal, and servomotor means responsive to said difference signal and connected to actuate the control surface whereby the system functions in response to a given displacement of the manual controller to produce a rate of turn of the aircraft which is initially high and subsequently falls with time to a lower value substantially proportional to the displacement of the manual controller.

2. A control system as claimed in claim 1 in which said feedback signal providing means includes an integrating means responsive to said rate-of-turn measure for providing the delayed version of the measure of the rate of turn.

3. A control system as claimed in claim 2 including a polarity-reversing device, switch means for disconnecting the rate-of-turn measure from the integrating means and for re-connecting it to the integrating means through the polarity-reversing device which reverses its polarity, whereby the feedback signal becomes the difference between the rate-of-turn measure and a delayed version of the rate-of-turn measure and serves to damp out short-term oscillations of the aircraft even during turn of the aircraft produced by displacing the manual controller.

4. A control system as claimed in claim 1 in which said feedback signal providing means includes means including an R-C integrating network for obtaining the feedback signal by combining a signal that is a measure of the rate of turn with a signal obtained as the output of the R-C integrating network to which the rate-of-turn signal is applied as an input.

5. A control system as claimed in claim 1 including means for producing a signal that is a measure of the displacement of the control surface and for supplying said signal in opposition to the other signals applied to energize the servomotor means.

6. A control system as claimed in claim 1 including means for limiting the magnitude of the displacement signal produced by the deflection of the manual controller.

7. A control system as claimed in claim 1 including means for modifying the difference signal in dependence on the air speed of the aircraft.

8. A control system as claimed in claim 1 wherein the manual controller is a controller auxiliary to the normal manual controller provided in the aircraft, and wherein switch means is provided for switching control of the aircraft from one controller to the other.

9. A control system as claimed in claim 1 including means for limiting the feedback signal as a function of the air speed.

10. An aircraft control system comprising a servomotor adapted to be connected to actuate a control surface, a manual controller adapted to provide a control signal dependent on its displacement from a zero position, a device responsive to turning movements of the aircraft about the axis about which the control surface is effective to exercise control for providing a rate-of-turn signal in response to such turning movements, means for providing a signal that is a delayed version of the rate-of-turn signal, means for adding the rate-of-turn signal and the delayed version of the rate-of-turn signal, means for obtaining the difference between the signal that is a measure of the displacement of the manual controller and the signal from said adding means and for supplying said difference signal to energize the servomotor.

11. A control system as claimed in claim 10 including means for obtaining a signal that is a measure of the displacement of the control surface and for supplying said signal to energize the servomotor in opposition to the difference signal that is supplied to energize the servomotor.

12. An aircraft control system comprising a servomotor adapted to be connected to actuate a control surface, a manual controller adapted to provide a control signal dependent upon its displacement from a zero position, means responsive to turning movements of the aircraft about the axis about which the control surface is effective to exercise control for providing a rate-of-turn signal in response to such turning movements, delay means for providing a signal that is a delayed version of the rate-of-turn signal, means for obtaining a first difference signal that is the difference between the manual controller signal and the delayed rate-of-turn signal, amplifying means for amplifying the first difference signal, means for obtaining a second difference signal that is the difference between the amplified first difference signal and the rate-of-turn signal, and means for supplying the second difference signal to energize the servomotor whereby the system functions in response to a given displacement of the manual controller to produce a rate-of-turn of the aircraft which is initially high and subsequently falls with time to a lower value substantially proportional to the manual controller.

13. A control system as claimed in claim 12 including a polarity-reversing and attenuating device, switch means for disconnecting the rate-of turn signal from the delay means and for re-connecting it to the delay means through the polarity-reversing and attenuating device which reverses its polarity and attenuates the rate-of-turn signal by a factor that is approximately equal to the amplification factor of the amplifying means whereby short-term oscillations of the aircraft are damped out.

References Cited in the file of this patent

UNITED STATES PATENTS

| 2,137,974 | Fischel | Nov. 22, 1938 |
| 2,649,563 | Meredith | Aug. 18, 1953 |
| 2,797,379 | Young | June 25, 1957 |